US012675565B2

(12) United States Patent
Viclizki et al.

(10) Patent No.: US 12,675,565 B2
(45) Date of Patent: Jul. 7, 2026

(54) DETECTION OF A CLASS OF PROCESSES

(71) Applicant: NVIDIA CORPORATION, Santa Clara, CA (US)

(72) Inventors: Tamar Viclizki, Herzliya (IL); Vadim Gechman, Kibbutz Hulda (IL); Ahmad Saleh, Rina Villiage (IL); Bartley Richardson, Alexandria, VA (US); Gorkem Batmaz, Cambridge (GB); Avighan Majumder, Pune (IN); Vibhor Agrawal, Fremont, CA (US); Fang-Yi Wang, San Jose, CA (US); Douglas Luu, San Jose, CA (US)

(73) Assignee: NVIDIA CORPORATION, Santa Clara, CA (US)

( * ) Notice: Subject to any disclaimer, the term of this patent is extended or adjusted under 35 U.S.C. 154(b) by 470 days.

(21) Appl. No.: 17/567,166

(22) Filed: Jan. 3, 2022

(65) Prior Publication Data

US 2023/0133110 A1      May 4, 2023

(30) Foreign Application Priority Data

Nov. 3, 2021    (IN) .............................. 202141050580

(51) Int. Cl.
*G06F 21/52* (2013.01)
*G06F 21/55* (2013.01)
*G06N 20/20* (2019.01)

(52) U.S. Cl.
CPC ............ *G06F 21/52* (2013.01); *G06F 21/552* (2013.01); *G06N 20/20* (2019.01); *G06F 2221/034* (2013.01)

(58) Field of Classification Search
CPC .. G06F 21/52; G06F 21/552; G06F 2221/034; G06F 21/577; G06N 20/20
See application file for complete search history.

(56) References Cited

U.S. PATENT DOCUMENTS

| 7,996,814 B1 * | 8/2011 | Qureshi | ................. | G06N 5/048 |
| | | | | 717/172 |
| 8,092,412 B2 * | 1/2012 | Sherman | ................. | A61F 2/389 |
| | | | | 602/23 |

(Continued)

OTHER PUBLICATIONS

Alam et al.; Random Forest Classification for Detecting Android Malware; 2013; Retrieved from the Internet https://ieeexplore.ieee.org/abstract/document/6682136/; pp. 1-7 as printed. (Year: 2013).*

(Continued)

*Primary Examiner* — Michael W Chao
(74) *Attorney, Agent, or Firm* — PEARL COHEN ZEDEK LATZER BARATZ LLP

(57) ABSTRACT

A system and method may determine if a class of process (e.g. NN execution, cryptocurrency mining, graphic processing) is executing on a processor, or which class is executing, by calculating or determining features from execution telemetry or measurements collected from processors executing processes, and determining from at least a subset of the features the likelihood that the processor is executing the class of process. Execution telemetry may include data regarding or describing the execution of the process, or describing hardware used to execute the process, such as processor temperature, memory usage, etc.

14 Claims, 5 Drawing Sheets

(56) References Cited

U.S. PATENT DOCUMENTS

| | | | | |
|---|---|---|---|---|
| 8,191,421 | B2* | 6/2012 | Petelenz | F41H 1/02 |
| | | | | 73/11.01 |
| 8,407,774 | B2* | 3/2013 | Rodriguez | H04L 63/08 |
| | | | | 726/7 |
| 8,505,091 | B2* | 8/2013 | Greenlaw | H04L 63/1458 |
| | | | | 370/230 |
| 9,104,873 | B1* | 8/2015 | Chen | G06F 21/566 |
| 10,050,983 | B2* | 8/2018 | Xia | H04L 63/0245 |
| 10,061,922 | B2* | 8/2018 | Altman | H04L 63/1425 |
| 10,284,594 | B2* | 5/2019 | Wei | H04L 63/1458 |
| 10,345,771 | B2* | 7/2019 | Anno | G05B 15/02 |
| 10,476,906 | B1* | 11/2019 | Siddiqui | H04L 63/145 |
| 10,536,482 | B2* | 1/2020 | Gabaev | H04L 63/1425 |
| 10,673,883 | B2* | 6/2020 | Wetterwald | H04L 43/0852 |
| 10,782,990 | B1* | 9/2020 | Suarez | G06F 11/301 |
| 11,102,236 | B2* | 8/2021 | Shurtleff | H04L 43/065 |
| 11,181,899 | B2* | 11/2021 | Zhang | G05B 19/4183 |
| 11,472,568 | B2* | 10/2022 | Schwartz | G06N 3/02 |
| 11,645,075 | B1* | 5/2023 | Wasserstrom | G06N 3/084 |
| | | | | 712/234 |
| 11,726,507 | B2* | 8/2023 | Warren | G01K 1/20 |
| | | | | 236/100 |
| 11,823,517 | B2* | 11/2023 | Haci | G07C 9/25 |
| 2006/0173444 | A1* | 8/2006 | Choy | G06F 3/0673 |
| | | | | 607/60 |
| 2010/0313270 | A1* | 12/2010 | Kim | H04W 52/0264 |
| | | | | 726/24 |
| 2013/0347114 | A1* | 12/2013 | Altman | G06F 21/56 |
| | | | | 726/24 |
| 2014/0053260 | A1* | 2/2014 | Gupta | G06F 21/50 |
| | | | | 726/22 |
| 2014/0101762 | A1* | 4/2014 | Harlacher | G06F 3/0656 |
| | | | | 726/23 |
| 2014/0165203 | A1 | 6/2014 | Friedrichs et al. | |
| 2016/0036722 | A1* | 2/2016 | Obrecht | G06F 11/3409 |
| | | | | 709/226 |
| 2016/0098560 | A1* | 4/2016 | Friedrichs | G06F 21/562 |
| | | | | 726/23 |
| 2016/0275289 | A1* | 9/2016 | Sethumadhavan | |
| | | | | H04L 63/0428 |
| 2016/0371490 | A1* | 12/2016 | Shakarian | G06N 20/00 |
| 2017/0012997 | A1* | 1/2017 | Wu | H04L 63/12 |
| 2017/0032279 | A1* | 2/2017 | Miserendino | G06N 5/04 |
| 2017/0132058 | A1* | 5/2017 | McNutt | G06F 11/3409 |
| 2019/0215336 | A1* | 7/2019 | Zhang | H04L 69/164 |
| 2020/0053109 | A1* | 2/2020 | Lancioni | H04L 63/1425 |
| 2020/0153863 | A1* | 5/2020 | Wiener | H04L 63/0421 |
| 2020/0364338 | A1* | 11/2020 | Ducau | G06F 21/564 |
| 2021/0018347 | A1* | 1/2021 | Khoury | G06N 3/044 |
| 2021/0218763 | A1* | 7/2021 | Bargury | H04L 41/12 |
| 2022/0147815 | A1* | 5/2022 | Conwell | G06N 3/045 |
| 2022/0326994 | A1* | 10/2022 | Mueller | G06F 21/6218 |
| 2022/0366795 | A1* | 11/2022 | Sterling | G08G 5/0013 |
| 2023/0078208 | A1* | 3/2023 | Egboga | G06N 5/04 |
| | | | | 706/12 |
| 2023/0409715 | A1* | 12/2023 | Nissim | G06F 9/45533 |
| 2024/0040381 | A1* | 2/2024 | Kim | H04W 12/121 |

OTHER PUBLICATIONS

Zorov; How can I detect someone using my network for Bitcoin mining . . . ; 2018; retrieved from the Internet https://www.quora.com/How-can-I-detect-someone-using-my-network-for-Bitcoin-mining-other-than-slow-sluggish-internet-and-CPU; pp. 1-1 as printed. (Year: 2018).*

Biau et al.; A random forest guided tour; 2016; retrieved from the Internet https://link.springer.com/article/10.1007/s11749-016-0481-7; pp. 1-31, as printed. (Year: 2016).*

No stated author; Jul. 2024 Subject Matter Eligibility Examples; 2024; Retrieved from the Internet https://www.uspto.gov/sites/default/files/documents/2024-AI-SMEUpdateExamples47-49.pdf; pp. 1-35, as printed. (Year: 2024).*

Anomalous Behaviour Profiling using GPU statistics; article; downloaded on Sep. 24, 2021; Author Gorkem Batmaz.

\* cited by examiner

300 — Execute Processes

310 — Receive Telemetry Data

320 — Collect Information on Processes

330 — Calculate Features

340 — Group Features by Cores or Processors

350 — Input Data to Model

360 — Output from Model

DETECTION OF A CLASS OF PROCESSES

PRIOR APPLICATION DATA

The present application claims priority from prior Indian patent application 202141050580 filed on Nov. 3, 2021 and entitled "SYSTEMS AND METHODS FOR DETECTION OF CRYPTOCURRENCY MINING USING PROCESSOR METADATA", incorporated herein by reference in its entirety.

FIELD OF THE INVENTION

The invention relates generally to determining the use of a processor; for example if a processor is being used improperly to execute cryptocurrency mining processes instead of, for example, neural network execution processes.

BACKGROUND

A data center may include many computer processors executing disparate computer processes operated, controlled, or "owned" by remote entities, which may be customers of the data center. Processors in data centers may include for example CPUs (e.g., traditional architecture processors), graphics processing units (GPUs), or other processors. GPUs are specialized massively parallel hardware processors which may include thousands of relatively weak compute cores. Certain processes lend themselves to being computed at least in part on GPUs. In particular neural network (NN) execution, gaming, and cryptocurrency mining benefit from the use of GPUs.

Cryptocurrency mining may allow an entity to earn units of cryptocurrencies (e.g. the Bitcoin, Ethereum, Monero cryptocurrencies) as a reward for solving complex mathematical and computational problems.

Neural networks (NN) or connectionist systems are computing systems inspired by biological computing systems, but operating using manufactured digital computing technology. NNs are made up of computing units typically called neurons (which are artificial neurons, as opposed to biological neurons) communicating with each other via connections, links or edges. A NN is typically modelled as an abstract mathematical object, such as a function. A NN may be executed on a CPU or GPU as for example a sequence of matrix or tensor operations. GPUs and similar massively parallel hardware devices may be used to provide the large amounts of compute typically needed to operate NNs.

Entities may purchase bandwidth from a data center. Many different entities may have processes (e.g. NN execution, graphics processing, etc.) executing at a data center at the same time. Malicious entities may misuse data center compute or other resources by executing applications prohibited by the data center, for example resulting in downtimes and higher operating costs. An entity may hijack or hack processors at a data center to execute processes to mine cryptocurrencies. Hackers may cryptojack processors by for example infecting enterprise infrastructure with crypto mining software, which may be hidden. Cryptocurrency mining may shorten GPU life expectancy and damage GPU performance, and may reduce resources available to other processes or delay other processes in a data center.

SUMMARY

A system and method may determine if a process in a class of processes (e.g. NN execution, cryptocurrency mining, graphic processing) is executing on a processor, or from which class a process that is executing belongs to, by calculating or determining features from execution telemetry or measurements collected from processors executing processes, and determining from at least a subset of the features the likelihood that the processor is executing the class of process. Execution telemetry may include data regarding or describing the execution of the process, or describing hardware used to execute the process, such as processor temperature, memory usage, etc. A class of process or activity detected may include cryptocurrency mining activity on GPUs, the detection based on monitoring GPU measurements in data centers.

BRIEF DESCRIPTION OF THE DRAWINGS

Non-limiting examples of embodiments of the disclosure are described below with reference to figures attached hereto that are listed following this paragraph. Dimensions of features shown in the figures are chosen for convenience and clarity of presentation and are not necessarily shown to scale.

The subject matter regarded as the invention is particularly pointed out and distinctly claimed in the concluding portion of the specification. The invention, however, both as to organization and method of operation, together with objects, features and advantages thereof, can be understood by reference to the following detailed description when read with the accompanied drawings. Embodiments of the invention are illustrated by way of example and not limitation in the figures of the accompanying drawings, in which like reference numerals indicate corresponding, analogous or similar elements, and in which:

Figure 1:
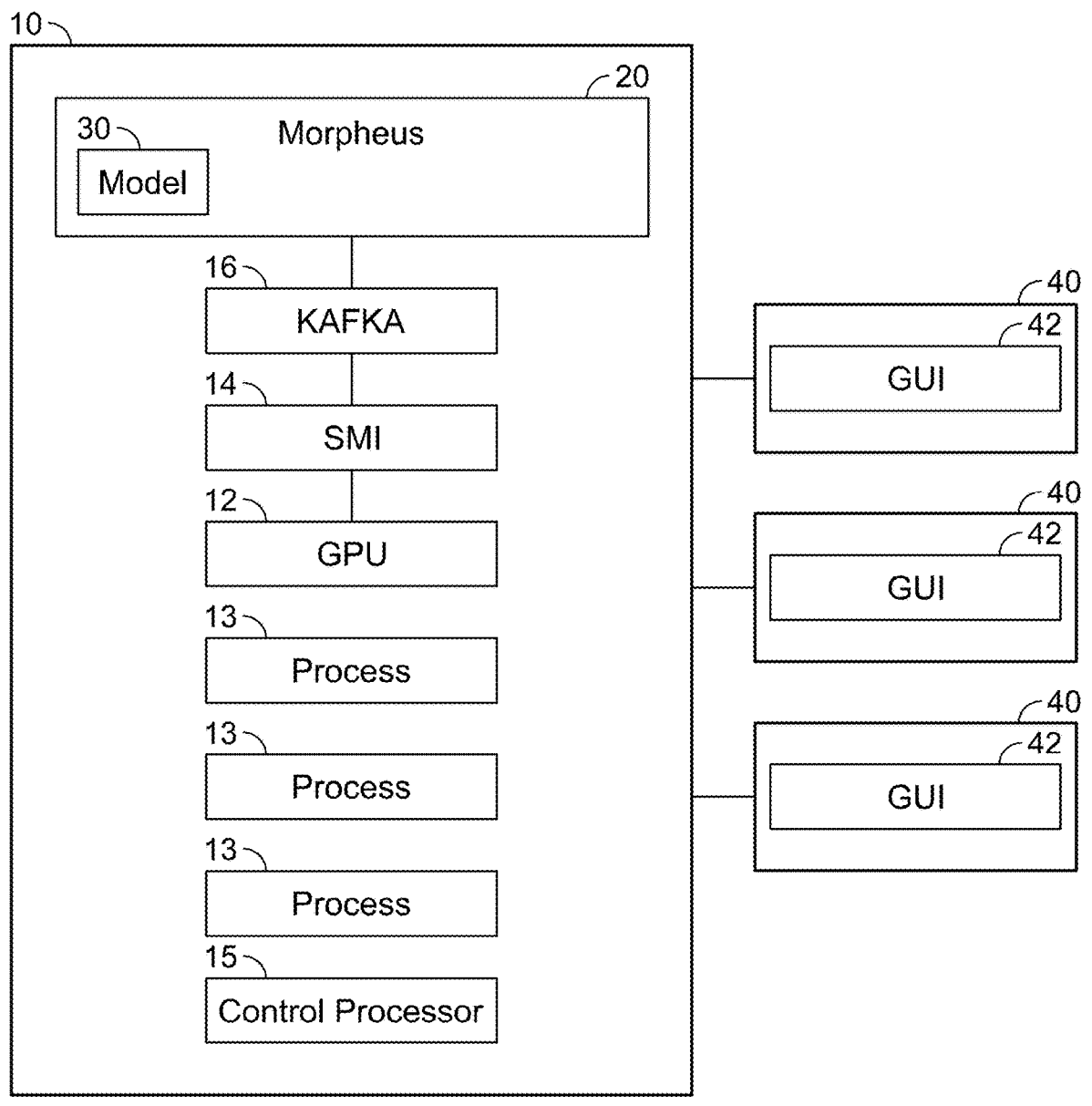
FIG. 1 depicts a system for executing processes according to embodiments of the present invention.

It will be appreciated that for simplicity and clarity of illustration, elements shown in the figures have not necessarily been drawn accurately or to scale. For example, the dimensions of some of the elements can be exaggerated relative to other elements for clarity, or several physical components can be included in one functional block or element.

DETAILED DESCRIPTION

In the following detailed description, numerous specific details are set forth in order to provide a thorough understanding of the invention. However, it will be understood by those skilled in the art that the present invention can be practiced without these specific details. In other instances, well-known methods, procedures, and components, modules, units and/or circuits have not been described in detail so as not to obscure the invention.

Embodiments of the invention may monitor measurements or telemetry from processors, such as GPUs, for example operating in data centers. The telemetry or measurements may be analyzed, and features may be derived from the measurements, e.g. mean, standard deviation, etc. These features may be analyzed and a report or alert may be created, for example describing the likelihood that a prohibited or undesirable process is being executed on a processor. In some embodiments, desirable or allowed processes (e.g. NN processing, gaming, graphics processing) may be executed on the same processor, concurrently with undesirable or prohibited processes (e.g. cryptocurrency processing), and the analysis may detect the undesirable process execution despite that allowed processes are executing in parallel on the same processor. An example cryptocurrency that may be for example maliciously or otherwise mined contrary to a policy (e.g. by mistake) is the Etherium cryptocurrency. In some embodiments a class of processes detected may include cryptocurrency mining for a specific "coin" or type of currency, and different classes may cover different specific coins. Other cryptocurrencies may be detected, and in some embodiments each cryptocurrency may have a different fingerprint or pattern of features. The prohibited process may be executed on the processor in violation of a policy of the entity owning the processor, e.g. via crytojacking or malicious cryptomining, and without the entity owning the processor knowing that cryptocurrency processing is taking place, and possibly without the entity external to the data center (e.g. the customer) which is requesting that the legitimate process be executed knowing its processes have been hijacked for a use other than intended by that entity.

While GPUs are discussed herein, other processors may be monitored. While data centers are discussed herein, other installations of processors may be monitored. While a targeted undesirable or prohibited process as discussed herein is cryptocurrency mining, other undesirable processes may be monitored. One example desired or allowed process discussed herein is NN processing (e.g. inference or training). However, other allowable processes may be used (e.g. graphics processing). Which class of process, e.g. desirable/ undesirable, cryptocurrency mining, NN processing, etc., being executing on one or more processors, may be determined, or the likelihood or probability of such execution may be determined. Data such as telemetry data may be collected from the equipment associated with execution of a process, e.g. a processor and/or associated components or equipment, such as processor or memory temperature, processor or memory usage, etc. Features or derivations may be derived from the telemetry, such as mean, average or rolling average, standard deviation or rolling standard deviation, etc. The features and/or telemetry data, or a subset of the features or telemetry data, may be provided to a machine learning (ML) model process, such as a random forest process model (e.g. model 30 in FIG. 1). The ML model may provide a likelihood that the process executing on the processor is in a certain class, e.g. is a certain type of cryptocurrency mining process. A feature derived or calculated from telemetry or other data may be a calculation typically based on multiple underlying data points which may reflect some trend or analysis of the underlying data points.

A random decision forest is an learning method using multiple decision trees at training time. The output of multiple trees is combined in some way to produce a single result (e.g., by majority decision, by most trees). Each tree may answer a series of questions to determine an answer, represented by a leaf node. A number of trees, called a forest, are used, where each tree uses a different random selection of input features, to create a forest of decision trees.

In one embodiment, a random forest may be trained by training many different trees, each tree starting its computation with a different feature for a root among the set of input features (e.g. features for a processor), where the features are labelled before training with the correct output, e.g. the class of process (e.g. cryptocurrency; not cryptocurrency). A random forest may be trained using bootstrap aggregating, or bagging, to tree learners, using labelled or tagged input feature sets. Given a training set X=x1, . . . , xn with responses Y=y1, . . . , yn, bagging repeatedly (B times) selects a random sample with replacement of the training set and fits trees to the samples.

Figure 3:
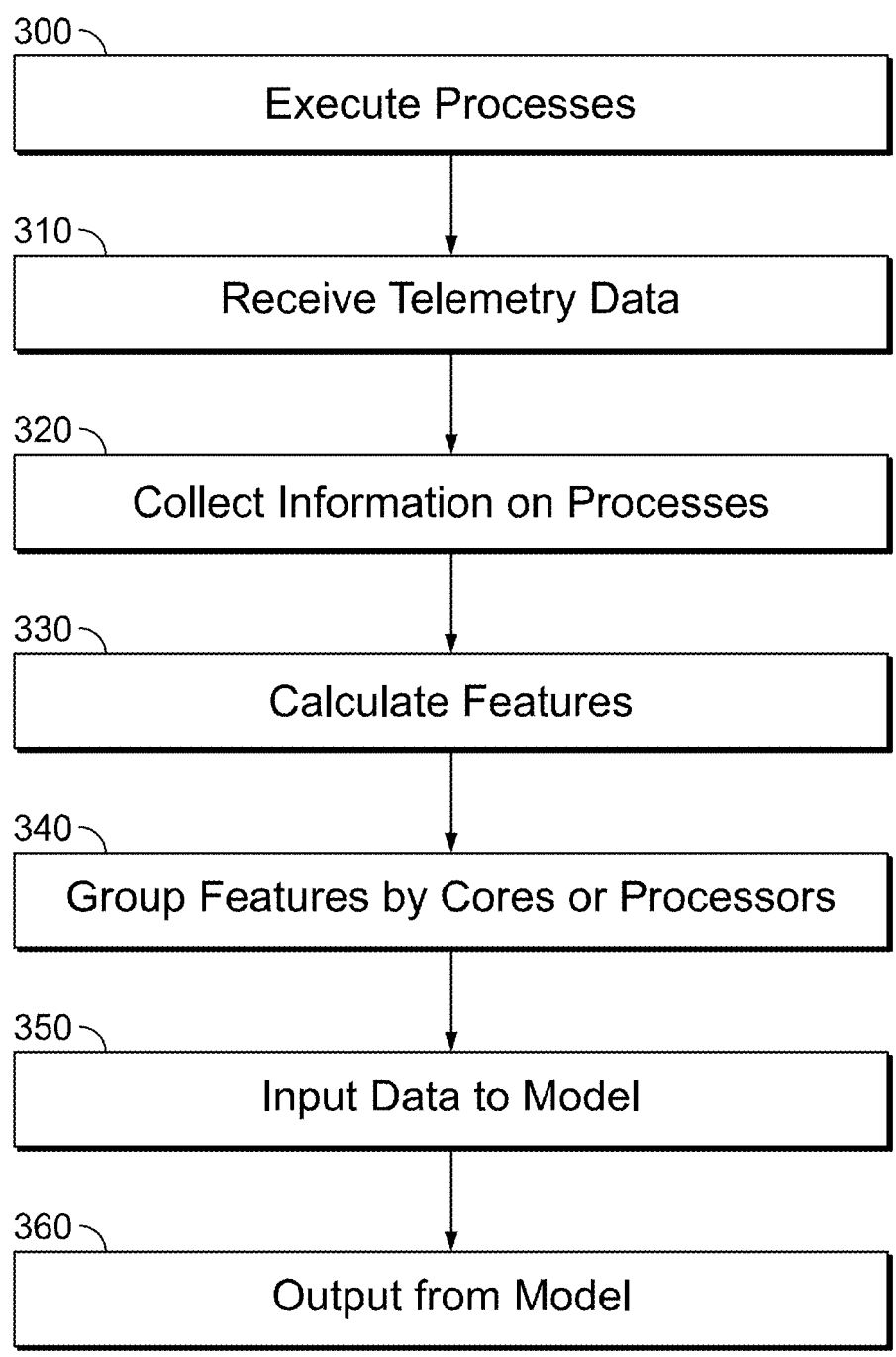
FIG. 3 is a flowchart of a method according to embodiments of the present invention.

Training may be based on data gathered and features generated via operations 310-340 of the example in FIG. 3. For these training features, the data known to be of a certain class may be labelled or tagged, e.g. by a human, and used for training purposes. For example, sets of features known to describe processing may be labelled "crypto" and "not crypto" or other suitable labels and sets of features known to describe cryptocurrency mining may be labelled "cryptocurrency mining". This may be used for training, testing and validations of ML models. Validation data may be mixed labelled data which is classified according to an ML model, and which has not been used to train or test the model. This helps to validate an ML model, and to ensure the model is not overfitted to specific data.

At inference, data for a specific processor, e.g. a set or vector of features, may be input to the forest, and a majority decision (e.g. a vote, an average) may be produced, each tree starting with different feature as a root (e.g. randomly).

FIG. 1 depicts a system for executing processes according to embodiments of the present invention. Referring to FIG. 1, one or more processors 12, e.g. GPUs, may exist at a data center 10, and may execute processes 13. Processors 12 may include, for example, the Nvidia A30 tensor core GPU, the Nvidia Pascal architecture GPU, or other processors. Various processes or systems may monitor and control processors 12. A system management interface (SMI) 14 may provide a command-line utility to monitor and manage processors 12, and may provide output, for example in XML (extensible markup language), text or other format. One or more data center control processors 15 may perform analysis and control processes at data center 10, such as interfacing with data center personnel, allocating resources, controlling or governing the execution by processors 12 of processes 13, and/or executing a data science analytics platform 20 and a model 30 to perform analytics. A software data bus 16, such as the Apache Kafka bus, may enable exchange of data and messages among components. One or more terminals 40 may communicate with the various systems and provide a graphical user interface (GUI) 42 to allow users to control processors 12, request or set up requests for alerts, and receive reports and alerts. A data science analytics platform 20, such as the Nvidia Morpheus platform, may aid in processing the large amount of data generated. A model 30 may analyze processor data according to methods described herein and produce warnings, alerts, reports, or other output. Model 30 may be included in data science analytics platform 20, but need not be. Model 30 may be for example a random forest model executed by a data center control processor 15 to determine which types or classes of processes are being executed at data center 10.

While specific monitoring or control processes are shown in FIG. 1, other processes may be used. Processors 12 may exist in contexts other than data centers. Typically, but not in all embodiments, one processor 12 executes one process 13, and data related to the executed process, e.g. held by the data center, may be used to correlate a process ID and the specific processor executing the process having the ID. However, in some embodiments, multiple processes 13 may be executed on one processor 12.

Figure 2:
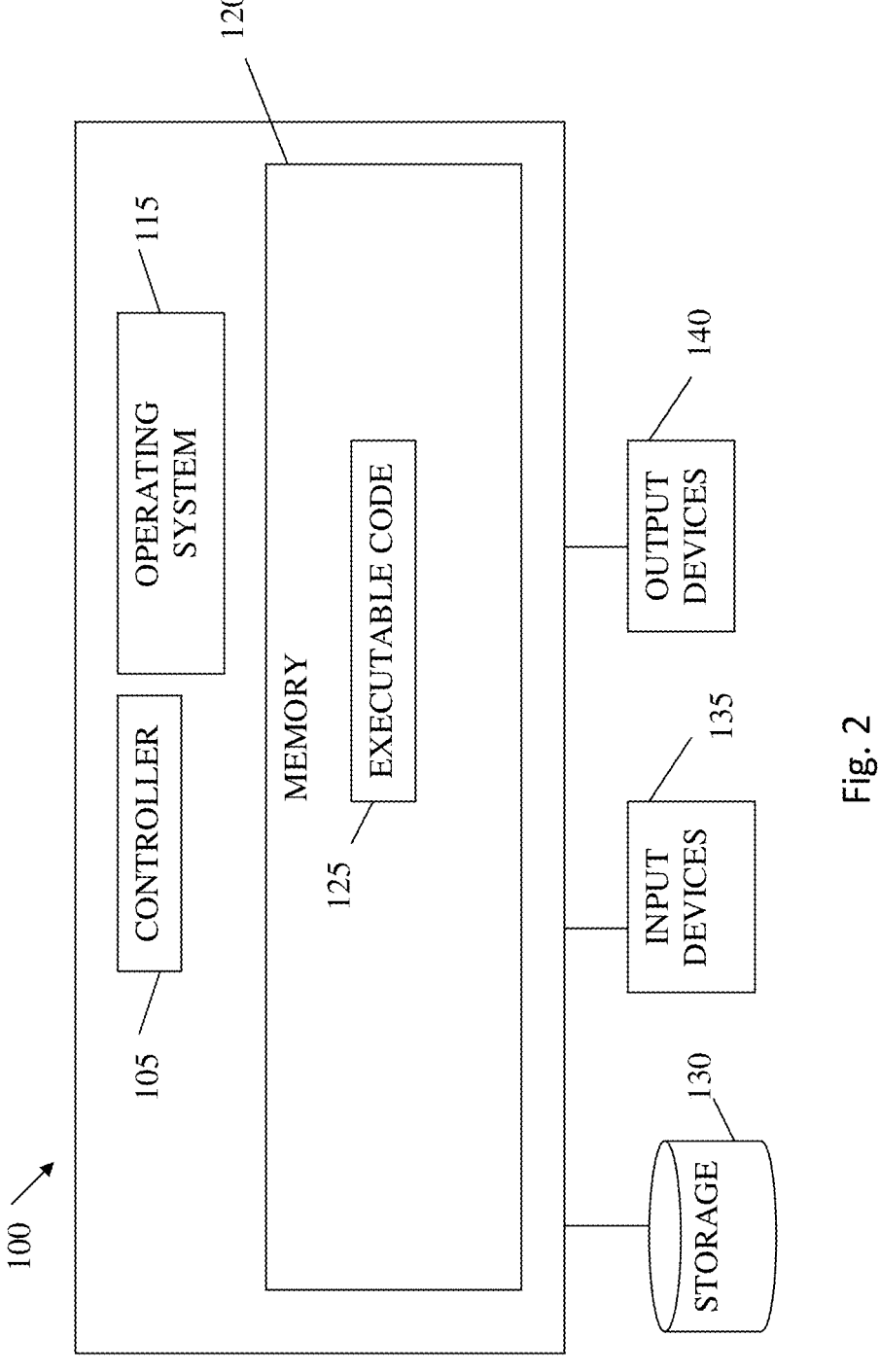
FIG. 2 shows a high-level block diagram of an exemplary computing device which may be used with embodiments of the present invention.

FIG. 2 shows a high-level block diagram of an exemplary computing device which may be used with embodiments of the present invention. Computing device 100 may include a controller or processor 105 that may be or include, for example, one or more central processing unit processor(s) (CPU), one or more Graphics Processing Unit(s) (GPU), a chip or any suitable computing or computational device, an operating system 115, a memory 120, a storage 130, input devices 135 and output devices 140. Each of modules and equipment such as processors 12, data center control processors 15, processes 13, data science analytics platform 20, terminals 40, and model 30, as shown in FIG. 1 and other modules or equipment mentioned herein may be or include, or may be executed by, a computing device such as included in FIG. 2 or specific components of FIG. 2, although various units among these entities may be combined into one computing device.

Operating system 115 may be or may include any code segment designed and/or configured to perform tasks involving coordination, scheduling, supervising, controlling or otherwise managing operation of computing device 100, for example, scheduling execution of programs. Memory 120 may be or may include, for example, a Random Access Memory (RAM), a read only memory (ROM), a Dynamic RAM (DRAM), a volatile memory, a non-volatile memory, a cache memory, or other suitable memory units or storage units. Memory 120 may be or may include a plurality of, possibly different memory units. Memory 120 may store for example, instructions to carry out a method (e.g. code 125), and/or data such as user responses, interruptions, etc.

Executable code 125 may be any executable code, e.g., an application, a program, a process, task or script. Executable code 125 may be executed by controller 105 possibly under control of operating system 115. For example, executable code 125 may when executed carry out methods according to embodiments of the present invention. For the various modules and functions described herein, one or more computing devices 100 or components of computing device 100 may be used. One or more processor(s) 105 may be configured to carry out embodiments of the present invention by for example executing software or code.

Storage 130 may be or may include, for example, a hard disk drive, a floppy disk drive, a Compact Disk (CD) drive, or other suitable removable and/or fixed storage unit. Data such as instructions, code, telemetry data, etc. may be stored in a storage 130 and may be loaded from storage 130 into a memory 120 where it may be processed by controller 105. Some of the components shown in FIG. 2 may be omitted.

Input devices 135 may be or may include for example a mouse, a keyboard, a touch screen or pad or any suitable input device. Any suitable number of input devices may be operatively connected to computing device 100 as shown by block 135. Output devices 140 may include displays, speakers and/or any other suitable output devices. Any suitable number of output devices may be operatively connected to computing device 100 as shown by block 140. Any applicable input/output (I/O) devices may be connected to computing device 100, for example, a wired or wireless network interface card (NIC), a modem, printer or facsimile machine, a universal serial bus (USB) device or external hard drive may be included in input devices 135 or output devices 140.

Embodiments of the invention may include one or more article(s) (e.g. memory 120 or storage 130) such as a computer or processor non-transitory readable medium, or a computer or processor non-transitory storage medium, such as for example a memory, a disk drive, or a USB flash memory, encoding, including or storing instructions, e.g., computer-executable instructions, which, when executed by a processor or controller, carry out methods disclosed herein.

FIG. 3 is a flowchart of a method according to embodiments of the present invention.

In operation 300, processes may be executed by one or more processors. For example GPUs at a data center or other organization may execute processes, for example on the part of third parties such as customers of the data center.

In operation 310, data such as telemetry data may be received or collected describing the processes being executed and/or describing hardware (e.g. processors, memory) used to execute the processes. For example, telemetry data describing processor temperature, memory temperature and many other data items may be collected. Data may be collected, for example, per sampling period.

In operation 320, information describing current processes being executed by the processors may be collected. For example, data linking an identifier of each process (e.g. process ID) to specific processors, may be collected. In some embodiments, one process may be associated with each processor (e.g., single tenant), but in other embodiments, multiple processes may be associated with a processor. In some embodiments, classification is specific to a processor, in tat the output is that a processor has a class of processes executing, rather than a process is a member of a class: in such a case it is typically simple for a supervisor to review the processes being executed by the processor to determine which of the multiple processes is an undesirable class.

Operations 310 and 320 may be concurrent and ongoing, e.g. telemetry data may be collected while analysis and output (e.g. operations 330-360) are being performed. Operations 310 and 320 may be performed in order to collect data to train a model used to perform analysis (e.g. operations 330-350).

Data may be transferred and processed before arriving at a system performing analysis. For example, a script may be executed which collects telemetry or measurements such as Nvidia system management interface (SMI) measurements from each GPU. Such measurements may be generated in XML format, and for ease of processing or reading may be converted to CSV (comma separated value) format. The CSV measurements may be piped or sent to a data science analytics platform such as the Morpheus platform. While an example structure is described for data processing and transmission, other platforms may be used to carry out embodiments of the present invention. Some data fields may be converted from Boolean, category (e.g. state or type), or alphanumeric, or other non-numeric data, to numeric data. E.g. data for 'pci_tx_util_num', 'pci_rx_util_num' (e.g. the number of packets transferred out or received by a processor during a measurement period) may be a string representing a number, and may be converted to a number.

In operation 330, features or derived parameters may be calculated from one or more measurements or telemetry data. For example, one or more rolling means or averages, each including a different range of times or number or periods, may be created from processor temperature data, and rolling standard deviation features may be created. Features other than average and standard deviation may be created. Typically, features are created on a per-processor basis: e.g. one type of measurement, such as temperature, from one processor, may be converted to a certain feature. Telemetry gathered based on measurements at non-processor equipment, e.g. memory, may be linked to a particular processor, and thus the telemetry and derived features from non-processor equipment may be tied to the particular processor. For example, a memory device may generate memory telemetry data related to memory use by multiple processors, but each telemetry item describing memory use may be connected to the particular processor involved in that memory use. Memory telemetry such as temperature may be linked to a processor or process, even if one memory unit serves multiple processors. For example, temperature for a memory unit or chip used by a group of eight processors may be used as telemetry for each of those processors. Even if only one of the eight processors is executing a crypto process, the telemetry of the memory when added to other telemetry for that process may help in detecting the crypto process on the one processor, and the seven processors not executing the crypto process may have other telemetry related to those processors help avoid the characterization of crypto for those X−1 processors.

In operation 340, data or features may be divided, grouped or assigned among processors, e.g. into groups indexed by the UUID (universally unique identifier) of each GPU or processor. A group may be created for each processor based for example on the UUID of the processor, and features or data relevant to that group may be associated with that group. Data may be associated with groups before features are created.

In operation 350, the data may be input to a model, such as a trained ML model (e.g., a random forest model), to determine if a class of process is or is not executing on a processor, or which classes include a process executing on a processor. An ML model resident as part of a data science analytics platform may be executed to determine for each processor the likelihood of a class of process being executed. In one embodiment, a set of features (possibly a subset of the features determined), such as in a vector, may be input to an ML model, where the feature vector is associated with a particular processor or processor ID. In some cases the order of features is not significant. ML models other than random forest may be used.

In operation 360, output may be produced for example by executing the model using a processor. Example output may include a determination of what class of process is executing on a processor, if a process from a certain class is executing, if that class is not executing (e.g. "no crypto"), or the likelihood that a process from a class is executing. The output may include a report or visualization showing the specific process suspected to be in the class, the suspected class and/or the processor executing the process. For example, if cryptocurrency mining, or a specific type of currency mining, is a class to be detected, an alert may be of the form of the following two example alerts:

{"pid": 136815, "crypto_probability": 92, "severity": Critical}
    {"pid": 136816, "crypto_probability": 81, "severity":Major} where PID is the process ID identifying the process being executed and which is described in the alert, crypto_probability is the likelihood (e.g. in percent) that the identified process is in the class cryptocurrency mining, and severity may be an expression of the urgency of the alert. Severity may be a user-defined output which may depend directly on the likelihood, or on other data such as a specific telemetry item (e.g. the temperature of the processor executing the particular process). Output may also include more general information regarding classes of processed being executed, for example, specific days, hours, weeks, times of a day that are more likely to have a class (e.g. crypto mining) of activity.

Telemetry measurements may be connected to or associated with specific equipment, such as a processor via a UUID. Information may be collected tying executing processes to processors: for example a data center may maintain a database associating processors with executing processes. In such a manner, output produced describing the classes of processes being executed by a processor may be associated with one or more or a set of executed processes: e.g. a processor may be identified as having a class of processes executing, and the PIDs of processes associated with that processor may be used to produce an output including the class and the processes associated with that class. Multiple PIDs may be associated with such a class, if multiple processes are executing on the processor; in such a case a human user may perform the final investigation as to which PID is in which class.

Other or different operations may be used.

Figures 4A, 4B:
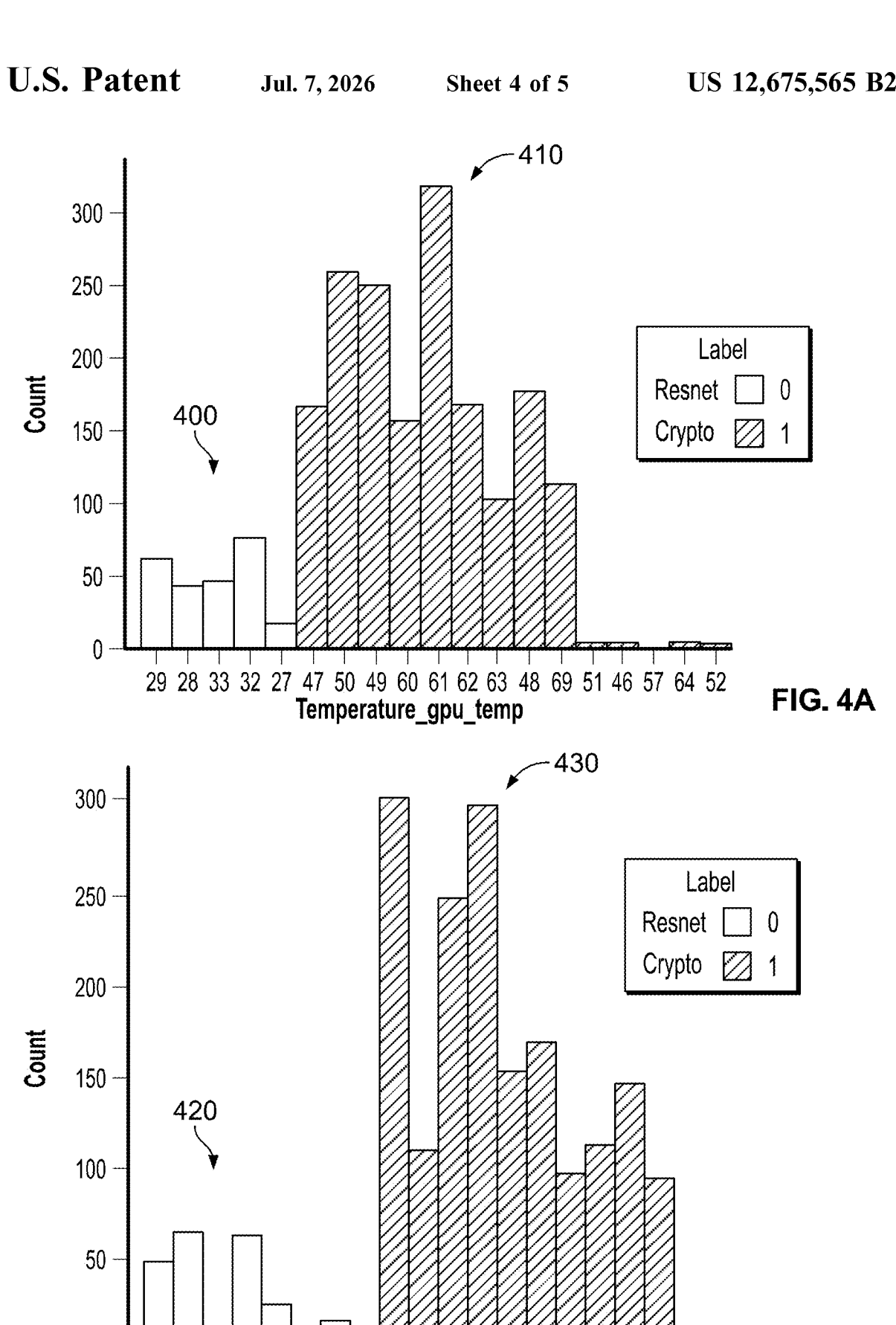
FIGS. 4A, 4B and 4C depict graphs showing of telemetry data between one class of process according to embodiments of the invention.
Figure 4C:
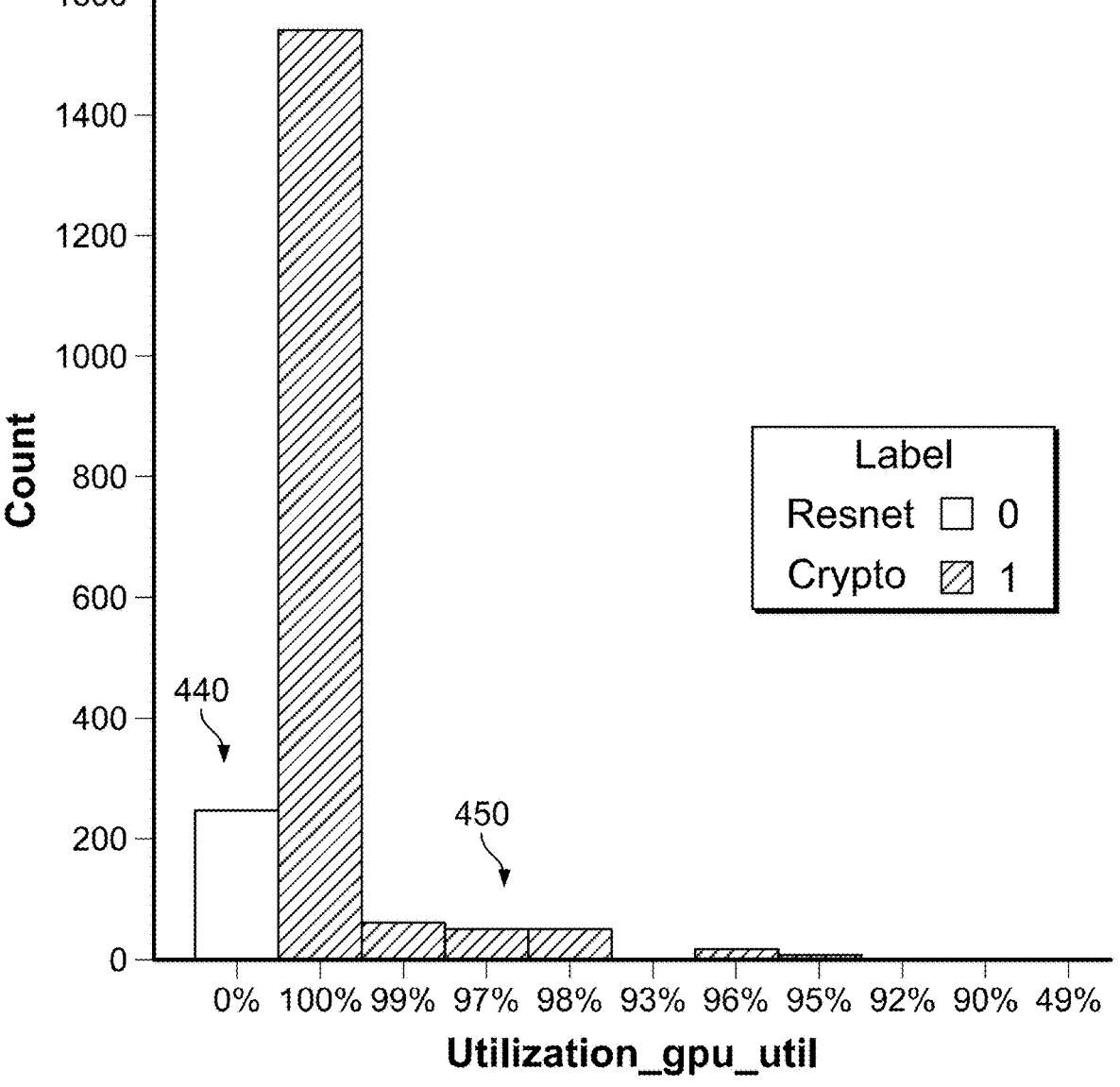

FIG. 4 depicts graphs showing comparisons of telemetry data between processes from one example class (e.g., the execution of three parallel ResNet50 NNs) and another example class (cryptocurrency mining) using one set of example data. ResNet-50 is a convolutional neural network that is 50 layers deep, which challenges GPU performance and has high level of GPU usage. In FIG. 4A, the X axis depicts bins of processor temperature measurements in a set of ranges at certain periods of time; and the Y axis depicts the count of telemetry items in each bin, e.g. the number of data items in each bin. Bins 400 depict temperature measurements for three parallel ResNet 50 NN processing and bins 410 depict temperature measurements for cryptocurrency mining. In FIG. 4B, the X axis depicts bins of memory temperature measurements in a set of ranges (at certain periods of time; and the Y axis depicts the count of telemetry items in each bin. Bins 420 depict temperature measurements for ResNet 50 NN processing and bins 430 depict temperature measurements for cryptocurrency mining. In FIG. 4C, the X axis depicts bins of processor utilization measurements in a set of percentages at certain periods of time; and the Y axis depicts the count of telemetry items in each bin. Bins 440 depict temperature measurements for ResNet 50 NN processing and bins 450 depict temperature measurements for cryptocurrency mining.

Features being derived and processed using a model may allow for the clear visual differences between two classes of processing as can be seen in FIG. 4, and may allow for such differences to be output as warnings or reports. FIG. 4 depicts parallel processes from different classes being executed at the same time on the same processor. The process depicted in FIG. 3 may detect classes of processes executing on processors where multiple processes in a class, and multiple processes outside the class, are executing on one processor, as well as when one process in a class is executing. In some embodiments, a processor executing multiple processes may generate telemetry which, when converted to features, allows embodiments to identify that a certain class (e.g. cryptocurrency processing) is being executed on that processor; this may be possible despite that a second class is also being executed on that same processor.

Embodiments may improve the detection of undesirable processes being executed by processors, which may in turn allow improvement in processing in the processors. Embodiments may allow for relatively easy detection of classes using telemetry data, automatically. In one validation of model according to an embodiment of the present invention, the accuracy of using a model inputting telemetry data to distinguish NN execution from cryptocurrency processing was 99%, with 347 true negative occurrences (e.g. no actual cryptocurrency processing, and no cryptocurrency report), zero false positive reports, one false negative report (e.g. undetected cryptocurrency mining), and 406 true positives reported (e.g. cryptocurrency actually processing and reported). Validation may be a check of the model which was trained and tested with different data. In one test of an embodiment of the present invention, the accuracy of using a model inputting telemetry data to distinguish NN execution from cryptocurrency processing was 99%, with 364 true negative occurrences, zero false positive reports, four false negative reports, and 388 true positives. Table 1 below depicts the above example error data:

TABLE 1

| Results | Test | Validation |
|---------|------|------------|
| Accuracy | 99% | 99% |
| TN | 364 | 347 |
| FP | 0 | 0 |
| FN | 4 | 1 |
| TP | 388 | 406 |

In some embodiments, a report or visualization may be output to or displayed to a user showing which features had the most effect on the classification of the processes among classes, e.g. which features are most important when determining the class of process executing on a processor. For example a report may produce a list ordered by importance of the following example list of features:

power_readings_power_draw_num_mean_roll_3 (rolling mean or average of power measurements by a processor over last three measurement periods or windows)

temperature_memory_temp_num_mean_roll_4 (rolling mean or average of memory temperature measurements over last four periods) temperature_memory_temp_num_mean_roll_8 (rolling mean or average of memory temperature measurements over last eight periods)

pci_tx_util_num_mean_roll_7 (number of packets transmitted per period from the processor, e.g. to an entity outside the data center, measured for example in megabits/second, computed as a rolling average of over last seven periods) temperature_memory_temp_num_mean_roll_7 (rolling mean or average of memory temperature measurements over last seven periods)

fb_memory_usage_free_num_mean_roll_9 (rolling mean or average over nine periods of frame buffer memory usage, e.g. how many frame buffers used by or allocated to a processor per period or window; may be measured in megabytes)

pci_rx_util_num_mean_roll_6 (number of packets received per period or window by the processor, e.g. from an entity outside the data center, measured for example in megabits/second, computed as a rolling average of over last seven periods)

The same underlying measurement—e.g. memory temperature—may be used multiple times, to produce different features, for example by using a different rolling mean or average period for that feature, or by using standard deviation instead of mean or average, each separate feature input to a model.

In one embodiment, many, e.g. 170, original measurements may be collected from processors executing processors, and features may be generated or derived from some or all of these measurements. Features may include for example several types of rolling mean and standard deviation calculations. Many features, such as 1,275 features in one example, may be generated.

Telemetry measurements may be obtained or recorded per period or sampling interval, e.g. once every 30 seconds or another period. Thus some telemetry measurements may reflect the temperature sampled once every period, or the number of events (e.g. packets sent) per that period. Other methods of sampling data periodically may be used.

Telemetry measurements taken from processors and other equipment may include, for example, power usage (e.g., in Watts or another suitable unit) of processors or other devices; temperature (e.g. in C or other suitable units) of processors, memory chips, or other equipment; utilization, such as streaming multiprocessor (SM) utilization, memory utilization, encoder and decoder utilization, the amount of time a kernel or processes was executing on a GPU during a sampling interval, etc. typically as a percent; processor and memory clocks (e.g. in MHz); power violations, for example as a percentage; thermal violations, e.g. as a Boolean flag; frame buffer and Bar1 or other virtual address space memory usage, e.g. in MB; error correction code memory (ECC) usage, e.g. expressed as the number of aggregated single bit and/or double bit ECC errors per period; PCIe (Peripheral Component Interconnect Express) replay errors, e.g. per period; PCIe receive (Rx) and transmit (Tx) Throughput, for example in MB/sec; and other telemetry. Memory or other throughput may be measured in Maxwell units as an alternative to data per second. Other telemetry collected may include, for example, product or equipment name or brand; display mode or activity; persistence mode, multi-instance (MIG) mode or other MIG factors; accounting mode or data; driver model data; serial numbers of equipment; VBIOS or other module versions; board or other equipment ID, GPU or other part number; inforom (a type of storage) or other equipment version number, or other inforom data; GPU virtualization or operation mode; PCI data such as domain, PCI/GPU link data such as width; PCT TX or RX, fan data such as speed; memory usage or allocation data; decoder or encoder utilization; latency data; memory errors for different types or modules of memory; retired pages data; remapping (e.g. remapped row) data; other temperature or power readings such as enforced power limit data; clock settings; and accounted processes. Other telemetry used may include, for example, the number of applications running on a specific kernel a GPU is using (which may be taken from driver model information), accounting_mode_buffer_size, driver_model_current_dm, driver_model_pending_dm, driver_model, minor_number, inforom_version_oem_object, inforom_version_ecc_object, inforom_version_pwr_object, inforom_version, gpu_operation_mode_current_gom, gpu_operation_mode_pending_gom, gpu_operation_mode, gpu_virtualization_mode_host_vgpu_mode, and gpu_virtualization_mode, ibmnpu_relaxed_ordering_mode.

Telemetry that is not numerical, e.g. a Boolean flag or an equipment identifier, may be converted to a number which may be a feature or converted to a feature. Units other than those provided here as an example may be used.

Telemetry may be converted to features or derived values before being input to a model. Features may include for example different rolling means. In some embodiments, more than one rolling mean, each based on the same underlying telemetry data, may be used, the means differing in for example the number of periods they extend back in time.

Features may be derived from the identification of components. For example, a string may be created representing the number of unique values of for example a board ID or PCI bus, and a number can be created which is a feature describing the number of unique entities per period, e.g. the number of unique board IDs per period. A board ID may be an identifier: each GPU may be connected to a different board ID (e.g. many to one).

A feature input to a model may include "power_readings_power_draw_num_mean_roll". Power readings may help to shed light on the current power usage of a processor, and the factors that affect that usage. When power management is enabled a GPU may limit power draw under load to fit within a predefined power envelope by manipulating the current performance state. "Roll" used in a feature name may indicate a rolling calculation, e.g. weighted by the last X periods; "mean" in a feature name may indicate a mean is to be used. A feature may include "temperature_memory_temp_num_mean_roll". This feature may include readings from temperature sensors on a board of components executing a process. A feature may include "pci_tx_util_num_mean_roll"; packets transmitted as explained elsewhere herein. This may measure how busy each GPU is over time with transferred packets and can be used to determine how much an application is using the GPUs in the system. A feature may include "fb_memory_usage_free_num_mean_roll" (e.g. frame buffer memory information or the available size of frame buffer memory. which may capture on-board memory information. Reported total memory is affected by ECC state; if ECC is enabled the total available memory is decreased by some percent, due to the requisite parity bits. The driver may also reserve a small amount of memory for internal use, even without active work on the GPU. A feature may include "temperature_gpu_temp_num_mean_roll", which may measure core GPU temperature. A feature may include "pci_rx_util_num_mean_roll", e.g., packets received as explained elsewhere herein. This may measure how busy each GPU is over time with received packets and can be used to determine how much an application is using the GPUs in the system. A feature may include "utilization_gpu_util_num_mean_roll", which may measure the percent of time over the past second or other period during which one or more kernels were executing on the GPU. A feature may include "utilization_memory_util_num_mean_ roll" which may measure the percent of time over the past period (e.g. 30 seconds) during which global (e.g. device) memory was being read or written. A feature may include "clocks_sm_clock", which may measure the current frequency of a SM (Streaming Multiprocessor) clock. A feature may include "clocks_graphics_clock", which may measure the current frequency of graphics (e.g. shader) clock.

A feature input to a model may include "gpu_temp_std_x_hr" which captures the deviation in the GPU temperature in the last 'x' periods of time. The x could vary, for example one hour or three hours, which may help to determine the increase of activity on GPUs due to the application execution. A feature input to the model may include "utilization_gpu_util_std_x_hr" which may capture deviation in the usage of GPU's utilization in last "x" periods of time.

Data may be divided per processor or core, e.g. into UUID groups, indexed by UUID of the processor. Features may be added to or associated with each UUID group. For example, for each processor or UUID group, features may be added including countable measurement mean (e.g. mean of countable measurements), various rolling standard deviation features, and rolling moving means for various statistics.

A rolling moving mean may attribute to recent in time values more weighting than older values, although the historic values may also be considered, each given less weighting further back in time. The latest rolling mean for a measurement may be calculated by multiplying the previous rolling mean for that measurement (e.g. for the immediately previous period) by n−1 (where n is the total number periods used for this particular rolling mean feature), adding the latest value for this measurement (e.g. from the most recent period), and then dividing the total by n, n being the total number of periods used for the rolling mean feature. For example, the following example formula may be used.

$$\text{Roll Moving Mean } (RMM) = ((RMM_{(t-1)}*(n-1)) + X_t)/n$$

Where:

n=The length of the moving mean, e.g. the number of time periods to be measured for the measurement (e.g. power_readings_power_draw_num_mean_roll_3 may be a moving mean calculation of length of three periods);

$X_t$=countable current measurement, e.g. the numeric representation of the measurement at time period t;

$RMM_{(t-1)}$ the calculated RMM for the immediately previous period t−1.

A rolling standard deviation (RMSD) may use weighed values in a similar manner to that used for RMM, for specific measurements. A rolling moving standard deviation may be a helpful indicator for periodic behavior such as tendency in measurements. Since in cryptocurrency mining activity periodic communication and transactions can be expected, those features highly contribute to detection of this class. Rolling moving standard deviation for a particular measurement may be calculated based on that measurement's RMM (for a certain period). A moving standard deviation may be created from the square root of all square subtractions of the moving mean from each of the individual data points or measurements used in the moving mean calculation. The following example formula may be used:

Rolling moving standard deviation for measurement $$X = \sqrt{\frac{(P_1 - RMMn)^2 + \ldots + (P_n - RMMn)^2}{n}}$$

Where:

RMMn is the rolling mean for the particular measurement for the past n periods.

$P_n$ is the data point for measurement X for the period n−1 periods in the past; e.g. if X is processor temperature $P_3$ is the processor temperature two periods in the past.

N=the number of periods over which the rolling standard deviation is calculated

A rolling Z-score feature may show the changes in the changes in a Z score with more weights to recent Z score than old Z score. A Z score may be a numerical measurement that maps current measurement with respect to how far a current measurement is from the overall group mean measurement. Z-score may be measured in terms of standard deviation from the mean. If a Z-score is 0, it may indicate that the data point's score is identical to the mean score. A Z-score of 1.0 would indicate a value that is one standard deviation from the mean whereas the positive Z-scores indicate score and negative score indicating it is below the mean. An example Z score may be:

$$Z \text{ score of measurement} = \frac{Pn - \mu}{\sigma}$$

Where:

P$_n$ is the data point for measurement X for the period n−1 periods in the past; e.g. if X is processor temperature P$_3$ is the processor temperature two periods in the past;

µ=mean value of the measurement

σ=standard deviation of the measurement.

An example rolling Z score of measurement may be measured by Rolling $$Z = \frac{P - RMMn}{RMSDn}$$

Where:

P is the data point for measurement X

RMMn is the rolling mean for the particular measurement for the past n periods.

RMSDn is the rolling standard deviation for the particular measurement for the past n periods.

One skilled in the art will realize the invention may be embodied in other specific forms using other details without departing from the spirit or essential characteristics thereof. The foregoing embodiments are therefore to be considered in all respects illustrative rather than limiting of the invention described herein. Scope of the invention is thus indicated by the appended claims, rather than by the foregoing description, and all changes that come within the meaning and range of equivalency of the claims are therefore intended to be embraced therein. In some cases well-known methods, procedures, and components, modules, units and/or circuits have not been described in detail so as not to obscure the invention. Some features or elements described with respect to one embodiment can be combined with features or elements described with respect to other embodiments.

Although embodiments of the invention are not limited in this regard, discussions utilizing terms such as, for example, "processing," "computing," "calculating," "determining," "establishing", "analyzing", "checking", or the like, can refer to operation(s) and/or process(es) of a computer, a computing platform, a computing system, or other electronic computing device, that manipulates and/or transforms data represented as physical (e.g., electronic) quantities within the computer's registers and/or memories into other data similarly represented as physical quantities within the computer's registers and/or memories or other information non-transitory storage medium that can store instructions to perform operations and/or processes.

Although embodiments of the invention are not limited in this regard, the terms "plurality" can include, for example, "multiple" or "two or more". The term set when used herein can include one or more items. Unless explicitly stated, the method embodiments described herein are not constrained to a particular order or sequence. Additionally, some of the described method embodiments or elements thereof can occur or be performed simultaneously, at the same point in time, or concurrently.

What is claimed is:

1. A method of determining if a class of process is executing on a processor among a plurality of processors, the method comprising:

deriving, using one or more of mean, average, rolling average, standard deviation, rolling standard deviation, number of unique entries, and Z-score, a plurality of features from a type of execution telemetry measurement collected from a processor executing a process, at least two of the features associated with a different period of time, and at least two features associated with the same telemetry measurement;

providing the plurality of features to a machine learning model comprising a random forest algorithm to determine from the plurality of features the likelihood that the processor is executing the class of process, the random forest algorithm combining the output of a plurality of decision trees, at least some of the decision trees trained using a different feature for a root and using bootstrap aggregating; and providing output including the likelihood and the processor associated with the likelihood.

2. The method of claim 1, wherein the class of process is cryptocurrency mining.

3. The method of claim 1, wherein the execution telemetry comprises data regarding the execution of the process.

4. The method of claim 1, wherein the execution telemetry is selected from the list consisting of device power usage; memory usage; processor temperature, transmission of packets from a processor; and receiving of packets to a processor.

5. The method of claim 1, wherein the type of execution telemetry measurement comprises one or more of the number of packets transmitted from a processor executing a process; and the number of packets received from the processor.

6. The method of claim 1, wherein the processor is executing a plurality of classes of processes at the same time.

7. The method of claim 1, comprising providing a visual report showing data from a plurality of classes of processes, wherein data from each class of process indicates a count of telemetry measurements per data bin.

8. A system for determining if a class of process is executing on a processor among a plurality of processors, the system comprising:

a memory; and a processor to:

derive, using one or more of mean, average, rolling average, standard deviation, rolling standard deviation, number of unique entries, and Z-score, a plurality of features from a type of execution telemetry measurement collected from a processor executing a process, at least two of the features associated with a different period of time and at least two features associated with the same telemetry measurement;

provide the plurality of features to a machine learning model comprising a random forest algorithm to determine from the plurality of features the likelihood that the processor is executing the class of process, the random forest algorithm combining the output of a plurality of decision trees, at least some of the decision trees trained using a different feature for a root and using bootstrap aggregating; and provide output including the likelihood and the processor associated with the likelihood.

9. The system of claim 8, wherein the class of process is cryptocurrency mining.

10. The system of claim 8, wherein the execution telemetry comprises data regarding the execution of the process.

11. The system of claim 8, wherein the execution telemetry is selected from the list consisting of device power usage; memory usage; processor temperature, transmission of packets from a processor; and receiving of packets to a processor.

12. A method of determining the likelihood of a process executing on a processor among a plurality of processors, the method comprising:

deriving, using one or more of mean, average, rolling average, standard deviation, rolling standard deviation, number of unique entries, and Z-score, a plurality of features from a type of telemetry measurement collected from one or more components associated with execution of the process, at least two of the features associated with a different period of time and at least two of the features associated with the same telemetry measurement;

providing the plurality of features to a machine learning model comprising a random forest algorithm to determine the likelihood of the process executing from the features, the random forest algorithm combining the output of a plurality of decision trees, at least some of the decision trees trained using a different feature for a root and using bootstrap aggregating; and providing output including the likelihood and the processor associated with the likelihood.

13. The method of claim 12, wherein the process is cryptocurrency mining.

14. The method of claim 12, wherein the telemetry is selected from the list consisting of device power usage; memory usage;

processor temperature, transmission of packets from a processor; and receiving of packets to a processor.

\* \* \* \* \*